United States Patent
Lee et al.

(10) Patent No.: US 9,567,409 B2
(45) Date of Patent: Feb. 14, 2017

(54) PREPARATION METHOD OF VINYL AROMATIC HYDROCARBON-CONJUGATED DIENE BLOCK COPOLYMER USING COUPLING REACTION WITH IMPROVED ION STABILITY

(75) Inventors: Choon-Hwa Lee, Daejeon (KR); Moon-Seok Chun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 35 days.

(21) Appl. No.: 13/508,700

(22) PCT Filed: Nov. 10, 2010

(86) PCT No.: PCT/KR2010/007913
§ 371 (c)(1),
(2), (4) Date: May 8, 2012

(87) PCT Pub. No.: WO2011/059225
PCT Pub. Date: May 19, 2011

(65) Prior Publication Data
US 2012/0245295 A1    Sep. 27, 2012

(30) Foreign Application Priority Data

Nov. 10, 2009 (KR) .................. 10-2009-0107875
Nov. 8, 2010 (KR) .................. 10-2010-0110409

(51) Int. Cl.
 C08F 2/06 (2006.01)
 C08F 257/02 (2006.01)
 C08F 297/04 (2006.01)

(52) U.S. Cl.
 CPC ............ *C08F 2/06* (2013.01); *C08F 297/044* (2013.01)

(58) Field of Classification Search
 CPC ....... C08F 2/06; C08F 297/02; C08F 297/023; C08F 297/044
 USPC ............ 525/244, 245, 249, 251, 314, 326.1, 525/332.9, 901
 See application file for complete search history.

(56) References Cited

U.S. PATENT DOCUMENTS

| | | | |
|---|---|---|---|
| 4,996,273 A | 2/1991 | Van Der Huizen | |
| 5,306,779 A | 4/1994 | Shibata et al. | |
| 5,461,095 A | 10/1995 | Van Dongen et al. | |
| 6,136,921 A * | 10/2000 | Hsieh | C08C 19/44 525/107 |
| 6,353,056 B1 * | 3/2002 | Knoll et al. | 525/98 |
| 6,391,981 B1 * | 5/2002 | Willis et al. | 525/370 |
| 6,455,651 B1 | 9/2002 | Willis et al. | |
| 2003/0100683 A1 * | 5/2003 | Toyoizumi | C08C 19/02 525/331.9 |
| 2009/0137704 A1 | 5/2009 | Rojas Garcia et al. | |

FOREIGN PATENT DOCUMENTS

| | | |
|---|---|---|
| JP | 62-215616 | 9/1987 |
| JP | 62215616 A | 9/1987 |
| JP | 07-070264 | 3/1995 |
| JP | 2001-310988 | 11/2001 |
| JP | 2001310988 A | 11/2001 |
| JP | 2002-504576 | 2/2002 |
| JP | 2002504576 A | 2/2002 |
| JP | 2002-308923 A | 10/2002 |
| JP | 2007-70453 A | 3/2007 |
| JP | 2012-532027 A | 12/2012 |
| KR | 10-2004-0104575 | 12/2004 |
| WO | WO 2009068980 A1 * | 6/2009 |

OTHER PUBLICATIONS

Machine tanslation of JP2001310988.*
Irganox 1076 product sheet downloaded Sep. 22, 2016 from http://www.resikem.com.ar/admin/archivos/tecnica/237/TDS_Irganox_1076.PDF.*
Pentaerythritol tetrakis[3-(3,5-di-t-butyl-4-hydroxyphenyl)propionate] chemical information downloaded Sep. 22, 2016 from http://www.chemicalbook.com/ChemicalProductProperty_EN_cb8489584.htm.*
Carlotti, S. et al., "Retarded Anionic Polymerization (RAP) of Styrene and Dienes" In: Polymer, May 19, 2009, vol. 50, pp. 3057-3067.

* cited by examiner

*Primary Examiner* — Irina S Zemel
*Assistant Examiner* — Jeffrey Lenihan
(74) *Attorney, Agent, or Firm* — Dentons US LLP

(57) ABSTRACT

Disclosed is a method for preparing a vinyl aromatic hydrocarbon-conjugated diene block copolymer using a coupling reaction with improved ion stability. The method comprises (a) polymerizing a vinyl aromatic hydrocarbon monomer in a hydrocarbon solvent with an organic lithium compound as a polymerization initiator to prepare a first mix solution comprising a vinyl aromatic hydrocarbon block; and (b) adding a conjugated diene monomer to the first mix solution of step (a) to form a conjugated diene block on an end of the vinyl aromatic hydrocarbon block and to thereby prepare a second mix solution comprising a vinyl aromatic hydrocarbon block-conjugated diene block, wherein the method further comprises (c) adding a Lewis acid to the first mix solution before, during or after polymerization of the vinyl aromatic hydrocarbon monomer of step (a).

5 Claims, 1 Drawing Sheet

PREPARATION METHOD OF VINYL AROMATIC HYDROCARBON-CONJUGATED DIENE BLOCK COPOLYMER USING COUPLING REACTION WITH IMPROVED ION STABILITY

TECHNICAL FIELD

The present invention relates to a method for preparing a vinyl aromatic hydrocarbon-conjugated diene block copolymer. More specifically, the present invention relates to a method for preparing a vinyl aromatic hydrocarbon-conjugated diene block copolymer using a coupling reaction with improved ion stability.

BACKGROUND ART

A styrene-butadiene-styrene triple block copolymer composed of a vinyl aromatic hydrocarbon block and a conjugated diene block is prepared by a solution polymerization using an anion initiator. Due to excessive exothermic reaction, a maximum polymerization temperature reaches 100° C. or higher.

During anion polymerization, the styrene-butadiene-styrene triple block copolymer is stabilized over a considerably long time, in particular, one week, at room temperature in the form of an anion on polymer chain ends immediately before the terminal reaction after growth reaction, but hydrogen anion separation reaction is caused by heat at a high temperature of 100° C. or higher and side reaction in which the terminal anions form unsaturated double bonds thus occurs. These side reactions are inevitable, although the time at which immediately before terminal reaction after growth reaction is taken is within several minutes.

Such side reactions cause deterioration in activity of an end of polymer chain and thus deterioration in coupling efficiency during coupling polymerization, cause reactions between anion ends of living polymers and polymers produced by side reactions, thus producing polymers with a doubled molecular weight. At this time, 10 to 15% by weight of the obtained polymer is generally produced. Furthermore, even during identical polymerization, since the content of polymers with a high molecular weight is not uniform, process control is not easy in products requiring accurate control of molecular weight and product defect rates thus increase.

In terms of physical properties, these side products improve physical properties of obtained products, but solution polymerization should be performed at low temperatures and at a low solid content due to deterioration in processability and limited control in the polymerization process, thus causing a deterioration in commercial applicability of products. Accordingly, there is a need for a method that can stabilize anion ends although polymerization is performed at a high temperature in order to secure commercial potential and maximize coupling efficiency through inhibition of production of side reactions and accurately control molecular weight.

DISCLOSURE

Technical Problem

Therefore, the present invention solves problems of conventional preparation methods of vinyl aromatic hydrocarbon-conjugated diene block copolymers and it is an object of the present invention to provide a method for preparing a vinyl aromatic hydrocarbon-conjugated diene block copolymer in which side reactions can be prevented by incorporating a Lewis acid, as a substance capable of stabilizing anion chain ends, into a polymer system of a conventional block copolymer during polymerization, and the molecular weight of block copolymers can be accurately controlled by performing coupling reaction.

The above and other objects can be accomplished by the present invention.

Technical Solution

In accordance with one aspect of the present invention, provided is a method for preparing a vinyl aromatic hydrocarbon-conjugated diene block copolymer using a coupling polymerization reaction with improved ion stability, comprising:

(a) polymerizing a vinyl aromatic hydrocarbon monomer in a hydrocarbon solvent with an organic lithium compound as a polymerization initiator to prepare a first mix solution comprising a vinyl aromatic hydrocarbon block; and (b) adding a conjugated diene monomer to the first mix solution of step (a) to form a conjugated diene block on the vinyl aromatic hydrocarbon block end and thereby prepare a second mix solution comprising a vinyl aromatic hydrocarbon block-conjugated diene block, Wherein the method further comprises:

(c) adding a Lewis acid to the first mix solution before, during or after polymerization of the vinyl aromatic hydrocarbon monomer of step (a); and (d) adding a silane or epoxy compound as a coupling agent to the second mix solution of step (b), and performing a coupling reaction to prepare a vinyl aromatic hydrocarbon-conjugated diene block copolymer having a number average molecular weight of 5,000 to 500,000 and comprising 5 to 50% by weight of a vinyl aromatic hydrocarbon block, based on 100% by weight of the vinyl aromatic hydrocarbon-conjugated diene block copolymer.

In the present invention, the silane compound and epoxy compound as the coupling agents may be a compound represented by the following Formula 1, 2 or 3.

(1)

wherein $R^1$ and $R^2$ each independently represent an alkyl group having 1 to 6 carbon atoms, or an aryl group having 5 to 18 carbon atoms; X represents a halogen; m, n, and p each independently represent an integer of 0 to 4 and satisfy an equation of $m+n+p=4$.

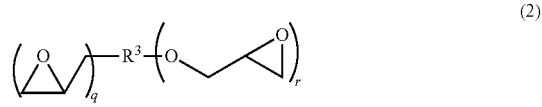

(2)

wherein $R^3$ represents an alkyl group having 1 to 20 carbon atoms, an aryl group having 5 to 24 carbon atoms, or an alkylaryl group having 6 to 30 carbon atoms;

q and r each independently represent an integer of 0 to 4 and satisfy an equation of $2 \leq q+r \leq 4$.

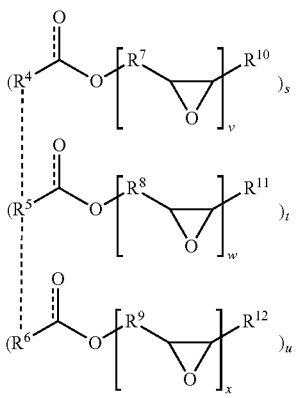

(3)

wherein $R^4$, $R^5$, $R^6$, $R^7$, $R^8$, $R^9$, $R^{10}$, $R^{11}$, and $R^{12}$ represent an alkyl group having 1 to 20 carbon atoms, an aryl group having 5 to 24 carbon atoms, or an alkylaryl group having 6 to 30 carbon atoms; s is 1, t and u each independently represent an integer of 0 to 1, and s, t and u satisfy an equation of 1≤s+t+u≤3. In addition, v, w, and x each independently represent an integer of 1 to 6 and satisfy an equation of 2≤v+w+x≤6.

In the present invention, the Lewis acid may be a compound represented by the following Formula 4.

$$(R^{13}O)_K\text{-M-}(OR^{14})_l \quad (4)$$

wherein M is Mg, B, Al, or Zn on the periodic table;

$R^{13}$ and $R^{14}$ each independently represent an alkyl group having 1 to 6 carbon atoms, an aryl group having 5 to 18 carbon atoms, or an alkylaryl group having 6 to 30 carbon atoms; and k and l each independently represent an integer of 0 to 3 and satisfy an equation of 2≤k+l≤3.

Here, the Lewis acid is preferably at least one selected from the group consisting of diethyl magnesium, di-n-propyl magnesium, di-isopropyl magnesium, dibutyl magnesium, triethyl aluminum, tri-isobutyl aluminum, tri-n-propyl aluminum, tri-n-hexyl aluminum, diethyl aluminum monohydride, diisobutylaluminum monohydride, diethyl zinc, di-n-propyl zinc, di-isoamyl zinc, di-isobutyl zinc, triethylborane, tri-sec-butylborane, tributylborane, trimethylborane, and triphenylborane.

In the present invention, a molar ratio of Lewis acid/organic lithium compound is 0.05 to 0.2, preferably 0.05 to 0.15, more preferably 0.05 to 0.1. In this case, a silane compound may be used as a coupling agent.

In addition, the silane compound may be at least one selected from the group consisting of tetrachlorosilane, trichloromethylsilane, and dichlorodimethylsilane.

In the present invention, a molar ratio of Lewis acid/organic lithium compound is 0.05 to 4, preferably 0.1 to 0.75. In this case, an epoxy compound may be used as a coupling agent.

The epoxy compound may be at least one selected from the group consisting of 1,2,7,8-diepoxyoctane, diglycidyl-1,4-butane diol, bisphenol A diglycidyl ether and bisphenol F diglycidyl ether, epoxylated soybean oil and epoxylated rinse oil.

In the present invention, the vinyl aromatic hydrocarbon may be at least one selected from the group consisting of styrene, alpha methylstyrene, 3-methylstyrene, 4-methylstyrene, 4-propylstyrene, 1-vinylnaphthalene, 4-cyclohexylstyrene, 4-(p-methylphenyl)styrene, and 1-vinyl-5-hexylnaphthalene.

In addition, the conjugated diene may be at least one selected from the group consisting of 1,3-butadiene, 2,3-dimethyl-1,3-butadiene, piperylene, 3-butyl-1,3-octadiene, isoprene, and 2-phenyl-1,3-butadiene.

BRIEF DESCRIPTION OF THE DRAWINGS

The above and other objects, features and other advantages of the present invention will be more clearly understood from the following detailed description taken in conjunction with the accompanying drawings, in which.

ADVANTAGEOUS EFFECTS

Figure 1:
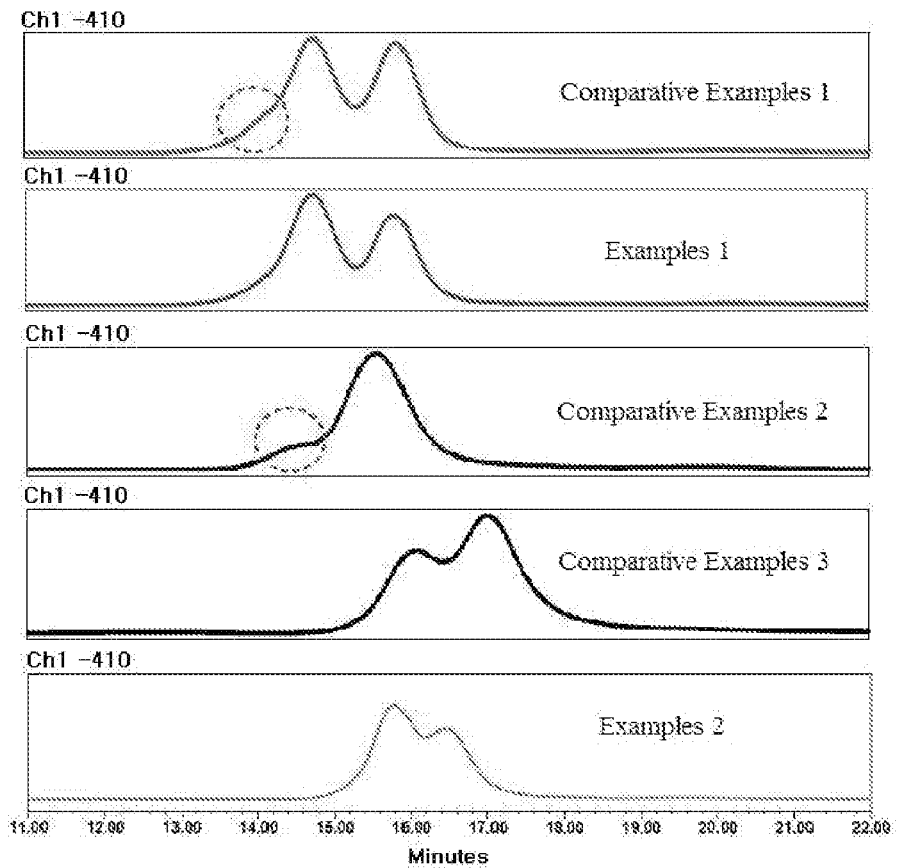
FIG. 1 shows gel permeation chromatography profiles of polymers produced in Comparative Examples 1 to 3 and Examples 1 to 2.

As apparent from the fore-going, the present invention solves problems of conventional preparation methods of vinyl aromatic hydrocarbon-conjugated diene block copolymers and it is an object of the present invention to provide a method for preparing a vinyl aromatic hydrocarbon-conjugated diene block copolymer in which side reactions can be prevented by incorporating a Lewis acid, as a substance capable of stabilizing anion chain ends, into a polymer system of conventional block copolymers during polymerization, and the molecular weight, molecular weight distribution, viscosity and processability of block copolymers can be accurately controlled by improving coupling efficiency during coupling reaction.

[Best Mode]

Hereinafter, the present invention will be described in more detail.

The present invention can minimize side reactions caused by heat even after growth reactions by adding an initiator used for solution polymerization of conventional vinyl aromatic hydrocarbon-conjugated diene block copolymers and Lewis acids stabilizing anions on chain ends during initiation and growth reactions.

It is not easy to control the side reactions in a conventional anion polymerization manner. The side reactions can be controlled only at a considerably low solid content or through a low-temperature process at a maximum reaction temperature of 100° C. or lower and thus polymers cannot be prepared.

A hydrogen separation reaction occurs through several side reactions to improve production efficiency, thus causing a deterioration in activity of polymer chain ends and coupling efficiency during coupling polymerization. Polymers produced by this heat termination reaction are coupled with active polymers to produce a substance having a much higher molecular weight than a target molecular weight. As a result, it is impossible to prepare the designed block copolymer. When this problem is overcome, the designed copolymer can be readily produced.

A method for preparing vinyl aromatic hydrocarbon-conjugated diene block copolymers using a coupling polymerization reaction with improved ion stability according to the present invention comprises:

(a) polymerizing a vinyl aromatic hydrocarbon monomer in a hydrocarbon solvent with an organic lithium compound as a polymerization initiator to prepare a first mix solution comprising a vinyl aromatic hydrocarbon block; and (b) adding a conjugated diene monomer to the first mix solution of step (a) to form a conjugated diene block on the vinyl aromatic hydrocarbon block end and thereby prepare a second mix solution comprising a vinyl aromatic hydrocarbon block-conjugated diene block, wherein the method further comprises:

(c) adding a Lewis acid to the first mix solution before, during or after polymerization of the vinyl aromatic hydrocarbon monomer of step (a); and (d) adding a silane or epoxy compound as a coupling agent to the second mix solution of step (b), and performing a coupling reaction to prepare a vinyl aromatic hydrocarbon-conjugated diene block copolymer having a number average molecular weight of 5,000 to 500,000 and comprising 5 to 50% by weight of a vinyl aromatic hydrocarbon block, based on 100% by weight of the vinyl aromatic hydrocarbon-conjugated diene block copolymer.

The Lewis acid is preferably incorporated after polymerization initiation of the vinyl aromatic hydrocarbon monomer of step (a) before polymerization termination of the conjugated diene monomer of step (b), more preferably, after polymerization of the vinyl aromatic hydrocarbon monomer of step (a) and before incorporation of the conjugated diene monomer of step (b). In this case, polymerization rate does not deteriorate and production efficiency and economical efficiency are advantageously superior.

Step (a)

First, a method for preparing a vinyl aromatic hydrocarbon-conjugated diene block copolymer according to the present invention comprises (a) polymerizing a vinyl aromatic hydrocarbon monomer in a hydrocarbon solvent with an organic lithium compound as a polymerization initiator to prepare a first mix solution comprising a vinyl aromatic hydrocarbon block (vinyl aromatic hydrocarbon polymer).

The hydrocarbon solvent may be selected from solvents commonly known as solvents for anion polymerization and, specifically, cyclic aliphatic hydrocarbon-based solvents such as cyclopentane, cyclohexane or cycloheptane, benzene, alkyl-substituted aromatic hydrocarbon-based solvents such as naphthalene, toluene and xylene, linear or branched aliphatic hydrocarbon-based solvents such as pentane, hexane, heptane, octane and the like. Preferably, cyclohexane, n-hexane or n-heptane is used alone or in combination thereof.

The temperatures at respective steps during polymerization reactions may be identical or different, or may be constant temperature or insulation conditions. A possible reaction temperature range may be −10 to 150° C., preferably 10 to 100° C.

In addition, as the vinyl aromatic hydrocarbon monomer, styrene, alpha methylstyrene, 3-methylstyrene, 4-methylstyrene, 4-propylstyrene, 1-vinylnaphthalene, 4-cyclohexylstyrene, 4-(p-methylphenyl)styrene, or 1-vinyl-5-hexylnaphthalene may be used alone or in combination of two or more types.

In addition, the anion polymerization initiator used in the present invention is an organic lithium compound as the polymerization initiator, may be any organic alkali metal compound and is preferably an organic lithium compound. The organic lithium compound is an organic lithium compound that may be represented by formula of RLi and has a polymerization initiation property, in which R may be selected from those commonly used for conventional anion polymerization such as alkyl having 1 to 20 carbon atoms, cycloalkyl, aryl and the like. Examples of more preferred organic lithium initiators include n-butyl lithium, sec-butyl lithium, methyl lithium, ethyl lithium, isopropyl lithium, cyclohexyl lithium, allyl lithium, vinyl lithium, phenyl lithium, benzyl lithium and combinations thereof.

Step (b)

A method for preparing a vinyl aromatic hydrocarbon-conjugated diene block copolymer according to the present invention may include (b) adding the conjugated diene monomer of the first mix solution of step (a) to vinyl aromatic hydrocarbon block ends after step (a) to prepare a conjugated diene block and thereby preparing a second mix solution comprising a vinyl aromatic hydrocarbon block-conjugated diene block.

Here, as a conjugated diene, 1,3-butadiene, 2,3-dimethyl-1,3-butadiene, piperylene, 3-butyl-1,3-octadiene, isoprene, or 2-phenyl-1,3-butadiene may be used alone or in combination thereof.

Step (c)

A method for preparing a vinyl aromatic hydrocarbon-conjugated diene block copolymer according to the present invention may include (c) adding a Lewis acid to the first mix solution before, during or after polymerization of the vinyl aromatic hydrocarbon monomer of step (a).

The Lewis acid is preferably incorporated after completion of polymerization of the vinyl aromatic hydrocarbon monomer of step (a) before completion of polymerization of the conjugated diene monomer of step (b), more preferably, after completion of polymerization of the vinyl aromatic hydrocarbon monomer of step (a) before incorporation of the conjugated diene monomer. In this case, there is no deterioration in rate of polymerization and production efficiency and economic efficiency are advantageously superior.

Here, a compound represented by the following formula 4 may be used as a Lewis acid:

$$(R^{13}O)_K\text{-}M\text{-}(OR^{14})_l \qquad (4)$$

wherein M is Mg, B, Al, or Zn on the periodic table;

$R^{13}$ and $R_{14}$ each independently represent an alkyl group having 1 to 6 carbon atoms, an aryl group having 5 to 18 carbon atoms, or an alkylaryl group having 6 to 30 carbon atom; and k and l each independently represent an integer of 0 to 3 and satisfy an equation of $2 \leq k+l \leq 3$.

Here, the Lewis acid is preferably diethyl magnesium, di-n-propyl magnesium, di-isopropyl magnesium, dibutyl magnesium, triethyl aluminum, tri-isobutyl aluminum, tri-n-propyl aluminum, tri-n-hexyl aluminum, diethyl aluminum monohydride, diisobutylaluminum monohydride, diethyl zinc, di-n-propyl zinc, di-isoamyl zinc, di-isobutyl zinc, triethylborane, tri-sec-butylborane, tributylborane, trimethylborane, triphenylborane or a combination thereof.

Step (d)

A method for preparing a vinyl aromatic hydrocarbon-conjugated diene block copolymer according to the present invention may include (d) adding a silane or epoxy compound as a coupling agent to the second mix solution of step (b), and performing a coupling reaction to prepare a vinyl aromatic hydrocarbon-conjugated diene block copolymer having a number average molecular weight of 5,000 to 500,000 and comprising 5 to 50% by weight of a vinyl aromatic hydrocarbon block, based on 100% by weight of the vinyl aromatic hydrocarbon-conjugated diene block copolymer (d).

Here, each of the silane compound and epoxy compound may be a compound represented by the following Formula 1, 2 or 3 as the coupling agent.

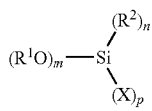
(1)

wherein $R^1$ and $R^2$ each independently represent an alkyl group having 1 to 6 carbon atoms, or an aryl group having 6 to 18 carbon atoms and X represents a halogen group, m, n, and p each independently represent an integer of 0 to 4 and satisfy an equation of m+n+p=4.

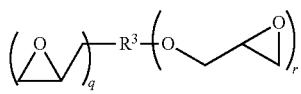
(2)

wherein $R^3$ represents an alkyl group having 1 to 20 carbon atoms, an aryl group having 6 to 24 carbon atoms, or an alkylaryl group having 7 to 30 carbon atoms, and q and r each independently represent an integer of 0 to 4 and satisfy an equation of 2≤q+r≤4.

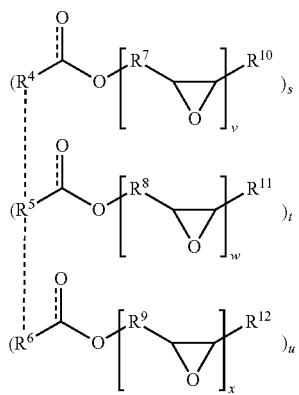
(3)

wherein $R^4$, $R^5$, $R^6$, $R^7$, $R^8$, $R^9$, $R^{10}$, $R^{11}$, and $R^{12}$ represent an alkylene group (bivalent) or an alkyl group (monovalent) having 1 to 20 carbon atoms, an arylene group or aryl group having 6 to 24 carbon atoms, or an alkyl arylene group having 7 to 30 carbon atoms, an aryl alkylene group or an alkyl aryl group, s is 1, and t and u each independently represent an integer of 0 to 1 and satisfy an equation of 1≤s+t+u≤3. In addition, v, w, and x each independently represent an integer of 1 to 6 and satisfy an equation of 2≤v+w+x≤6.

Here, a molar ratio of a Lewis acid/organic lithium compound is 0.05 to 0.2, a silane compound is preferably used as the coupling agent, and tetrachlorosilane, trichloromethylsilane, or dichlorodimethylsilane is more preferably used alone or in combination thereof.

Here, when the molar ratio of Lewis acid/organic lithium compound is lower than 0.05, stability of polymer end ions is similar to when a Lewis acid is not incorporated, and the case in which the molar ratio is lower than 0.05 is not preferable and the case in which the molar ratio exceeds 0.2, when a halogen silane is used as the coupling agent, the content of the triple block copolymer is lower than 10% and is thus disadvantageous in terms of preparation of the triple block copolymer.

Meanwhile, a molar ratio of Lewis acid/organic lithium compound is 0.05 to 4 and an epoxy compound is used as a coupling agent.

Here, more preferably, the molar ratio is 0.1 to 0.75. As the epoxy compound, 1,2,7,8-diepoxyoctane, diglycidyl-1,4-butane diol, bisphenol A diglycidyl ether, or bisphenol F diglycidyl ether, epoxylated soybean oil and epoxylated rinse oil is preferably used alone or in combination thereof. Here, the case in which the molar ratio of Lewis acid/organic lithium compound is lower than 0.05 exhibits similar stability of polymer end ions to the case in which Lewis acid is not incorporated, and does not disadvantageously exhibit stability improvement effect on preparation of triple block copolymers, and the case in which the molar ratio exceeds 4, polymerization, disadvantageously, does not occur.

Now, the present invention will be described in more detail with reference to the following examples. These examples are only provided to illustrate the present invention and should not be construed as limiting the scope and spirit of the present invention.

EXAMPLES

The polymerization method of the vinyl aromatic hydrocarbon-conjugated diene block copolymer will be described in brief.

In a reactor comprising organic lithium and a hydrocarbon solvent, vinyl aromatic hydrocarbon was incorporated and was stood until 99% or more of a vinyl aromatic hydrocarbon monomer was exhausted, a conjugated diene monomer was added to the reactor, polymerization was performed until 99% or more of the conjugated diene monomer was exhausted, a coupling agent was incorporated and coupling reaction was performed to prepare a linear or radial block copolymer.

At this time, Lewis acid to stabilize ions of chain ends during initiation and growth reaction was incorporated before initiation of polymerization with organic lithium, during polymerization of vinyl aromatic hydrocarbon monomers, or after termination of polymerization of vinyl aromatic hydrocarbon monomer before termination of polymerization of conjugated diene monomers. Then, a reaction termination agent such as water or alcohol was added to the reactor in which activity of the active polymers was removed.

Example 1

Example 1 of the present invention is a polymerization process that improves ion stability of vinyl aromatic hydrocarbon-conjugated diene block copolymers using coupling polymerization and incorporating a Lewis acid.

Triple block copolymers were prepared at a weight ratio of 31/69 using styrene and butadiene as monomers as follows.

4256 g of cyclohexane as a solvent and 330 g of styrene were added to a 10 L reactor comprising nitrogen and 1.4 g of n-butyl lithium was added at a temperature of 65° C. to polymerize styrene. After polymerization of styrene, 0.37 g of triisobutyl aluminum was added and dispersed and 734 g of a butadiene monomer was further added thereto, to produce butadiene blocks on the polymerized styrene block ends.

After polymerization of butadiene, dichlorodimethylsilane was added in an amount disclosed in Table 2, coupling reaction was performed and 0.33 g of water was added thereto to terminate the polymerization reaction. Antioxidants, 0.4 parts by weight of Irganox 1076 (Ciba) and 0.9 parts by weight of trisnonylphenyl phosphite (Jinseong Chemical Co., Ltd., TNPP) were added.

Example 2

Triple block copolymers were prepared in the same manner as in Example 1 except that the amount of triisobutyl aluminum was increased to 1.81 g and 1,2,7,8-diepoxyoctane was used as a coupling agent.

Comparative Example 1

A triple block copolymer was prepared in the same manner as in Example 1 except that triisobutyl aluminum was not added as an ion stability enhancer.

Comparative Example 2

Triple block copolymers were prepared in the same manner as in Example 1 except that the amount of triisobutyl aluminum was increased to 1.81 g.

permeation chromatography are shown in Table 2 and FIG. 1 shows gel permeation chromatography profiles of examples shown in Table 2.

Gel permeation chromatography was used for comparison of the molecular weight, molecular weight distribution and profiles of copolymers, THF was used as the solvent, Gel permeation chromatography was measured at a temperature of 40° C. and at a rate of 1 ml/min.

Measurement of number average molecular weight was performed using a gel permeation chromatography apparatus.

Side reaction rate (%)—in gel permeation chromatography profiles, a ratio of an area with a large molecular weight produced through side reaction and an area of a coupled molecular weight was determined via a percentage method (% method) (×100).

Coupling efficiency (%)—a ratio of an area of a coupled molecular weight and an area of a non-coupled molecular weight was determined via a percentage method (% method) (×100).

TABLE 1

| Items | [Al]/[Li] molar ratio | Coupling agent | Maximum reaction temperature and pressure (° C.)/(bar) | Reaction time | Variation in temperature (° C.) | Variation in pressure (bar) |
|---|---|---|---|---|---|---|
| Comp. Ex. 1 | 0 | Dichlorodimethylsilane | 137.10/5.5 | 10'07" | 71.85 | 4.0 |
| Ex. 1 | 0.10 | Dichlorodimethylsilane | 135.50/5.5 | 11'25" | 70.65 | 4.3 |
| Comp. Ex. 2 | 0.5 | Dichlorodimethylsilane | 134.47/4.9 | 10'50" | 69.52 | 3.7 |
| Comp. Ex. 3 | 0.5 | Trichloromethylsilane | 135.68/5.5 | 16'18" | 70.77 | 4.3 |
| Ex. 2 | 0.5 | 1,2,7,8-Diepoxyoctane | 135.50/5.4 | 10'25" | 70.32 | 4.2 |

Comparative Example 3

A triple block copolymer was prepared in the same manner as in Comparative Example 2 except that 1.81 g of triisobutyl aluminum was added as an ion stability enhancer before reaction of styrene in Comparative Example 2 and trichloromethylsilane was used as a coupling agent instead of dichlorodimethylsilane.

Polymerization parameters of final styrene-butadiene-styrene block copolymers prepared in Comparative Examples 1, 2 and 3 and Examples 1 and 2 are shown in Table 1, analysis results of respective polymers were analyzed by gel As can be seen from Table 1 above, variation in the reaction temperature of Example was about 1.6 to 2.6° C. The overall reaction time of Example was about 0.5 to 1 minute longer than that of Comparative Example, but this difference was slight. On the other hand, when a Lewis acid was incorporated before styrene reaction in Comparative Example 3, reaction time was delayed by about 5 to 6 minutes and only about 60% reaction time of the overall reaction time was thus increased. Accordingly, in order to obtain polymers without deterioration in polymerization rate, a Lewis acid is preferably incorporated after reaction of styrene.

TABLE 2

| Items | [Al]/[Li] molar ratio | Coupling agent | [Coupling agent]/[Li] molar ratio | Side reaction ratio (%) | Molecular weight of coupled SBS (kg/mol) | Coupling efficiency (%) |
|---|---|---|---|---|---|---|
| Comp. Ex. 1 | 0 | Dichlorodimethylsilane | 1.04 | 11.5 | 115.1k | 55.4 |
| Ex. 1 | 0.10 | Dichlorodimethylsilane | 1.04 | — | 110.8k | 56.1 |
| Comp. Ex. 2 | 0.5 | Dichlorodimethylsilane | 1.20 | — | 115.4k | 8.3 |

TABLE 2-continued

| Items | [Al]/[Li] molar ratio | Coupling agent | [Coupling agent]/[Li] molar ratio | Side reaction ratio (%) | Molecular weight of coupled SBS (kg/mol) | Coupling efficiency (%) |
|---|---|---|---|---|---|---|
| Comp. Ex. 3 | 0.5 | Trichloromethylsilane | 0.79 | — | 109.1k | 35.09 |
| Ex. 2 | 0.5 | 1,2,7,8-Diepoxyoctane | 1.06 | — | 111.8k | 57.5 |

As can be seen from Table 2, a molar ratio of aluminum/lithium was 0 to 0.1 and coupling efficiency was substantially equivalent. As can be seen from FIG. 1, in Comparative Example 1, 11.5% of a polymer was produced and, in Examples 1 and 2 and Comparative Examples 2 and 3 in which aluminum was added, a polymer was barely produced.

When a ratio of aluminum/lithium increased from about 0.1 to about 0.5 in Comparative Example 2, coupling efficiency rapidly decreased from about 56% to 8.3%. This means that anions of polymer chain ends increased due to an aluminum compound as a Lewis acid, thus causing a deterioration in reactivity with dichloromethyl silane. This case means that the coupling agent was unsuitable.

On the other hand, an aluminum/lithium ratio of Comparative Example 3 was similar to that of Comparative Example 2, but the case in which trichloromethyl silane was used exhibited an about 28% increase in coupling efficiency from 8.3% to 35.09%, as compared to the case in which dichloromethyl silane was used, but, coupling efficiency of Comparative Example 3 was about 20% lower than that of Comparative Example 1, halogen silane was unsuitable for use as a coupling agent in systems in which the aluminum/lithium ratio is 0.1 or more.

In Example 2, as a result of tests in which the coupling agent was changed into epoxy-based 1,2,7,8-diepoxy octane, it was confirmed that coupling efficiency was improved to 57.5% even at an aluminum/lithium molar ratio similar to that of Comparative Examples 2 and 3. This means that a suitable coupling agent was epoxy, when the content of ion stability enhancer increases.

Examples 3 to 5

A copolymer was prepared in the same manner as in Example 2 except that diglycidyl-1,4-butane diol, bisphenol A diglycidyl ether, and bisphenol F diglycidyl ether were used as coupling agents.

Figure 2:
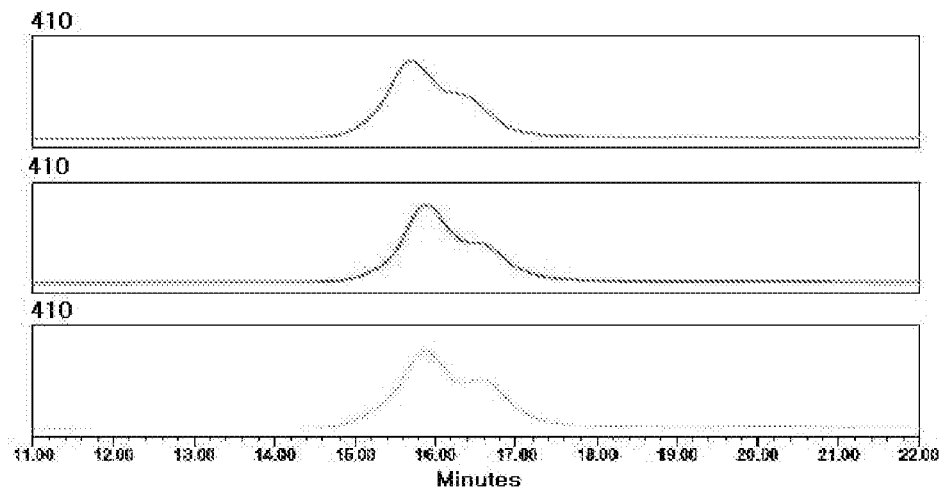
FIG. 2 shows an image of gel permeation chromatography profiles of polymers produced in Examples 3 to 5.

Table 3 and FIG. 2 show gel permeation chromatography analysis results and profiles of Examples 3 to 5.

According to gel permeation chromatography results of Table 3 and FIG. 2, as compared to an epoxy-based coupling agent used in Example 2, Examples 3 to 5 exhibited an about 8 to about 19% increase in coupling efficiency. This means that, when a suitable coupling agent is used, a coupling polymerization method may be used for polymerization of block copolymers by incorporating a Lewis acid capable of improving ion stability, and when the content of solid in a solution increases, coupling efficiency can be increased by inhibiting other side reactions such as thermal termination causing coupling deterioration. Accordingly, according to the preparation method of block copolymers according to the present invention, polymerization can be performed by increasing the solid content in solution during polymerization, and the molecular weight and molecular weight distribution of block copolymers can be accurately controlled.

In addition, in a case in which a Lewis acid was not used, as in Comparative Example 1, coupling efficiency was bad and side reactions increased. Since 10 to 15% of about two-fold molecular weight, as compared to the desired molecular weight, is present, physical properties are improved, but solution viscosity of products increases. Accordingly, the high molecular weight caused by side reactions is considered during polymerization, factors to be controlled increase, and it is not easy to realize the target viscosity and molecular weight designed during polymerization.

On the other hand, in examples according to the present invention, since high molecules were almost not formed by side reactions, the target molecular weight should be controlled during polymerization and block copolymers with the desired target viscosity and molecular weight can thus be produced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

TABLE 3

| | [Al]/[Li] molar ratio | Coupling agent | [Coupling agent]/[Li] molar ratio | Side reaction ratio (%) | Molecular ratio of coupled SBS (kg/mol) | Coupling efficiency (%) |
|---|---|---|---|---|---|---|
| Example 3 | 0.5 | Diglycidyl-1,4-butane diol | 1.24 | — | 116.5k | 71.4 |
| Example 4 | 0.5 | Bisphenol A diglycidyl ether | 0.99 | — | 97.9k | 74.3 |
| Example 5 | 0.5 | Bisphenol F diglycidyl ether | 1.04 | — | 102.6k | 63.5 |

The invention claimed is:

1. A method for preparing a vinyl aromatic hydrocarbon-conjugated diene block copolymer, comprising:
   (a) polymerizing a vinyl aromatic hydrocarbon monomer in a hydrocarbon solvent with an organic lithium compound as a polymerization initiator to prepare a first mix solution comprising a vinyl aromatic hydrocarbon block; and
   (b) polymerizing a conjugated diene monomer and the vinyl aromatic hydrocarbon block present in the first mix solution of the step (a) by adding the conjugated diene monomer to the first mix solution of the step (a) to form a conjugated diene block on an end of the vinyl aromatic hydrocarbon block and to thereby prepare a second mix solution comprising a vinyl aromatic hydrocarbon block-conjugated diene block,
   wherein the method further comprises:
   (c) adding an ion stabilizer to the first mix solution during or after polymerization of the vinyl aromatic hydrocarbon monomer of the step (a) and before adding the conjugated diene monomer of the step (b),
   (d) adding a coupling agent to the second mix solution of the step (b) and performing a coupling reaction to form a vinyl aromatic hydrocarbon-conjugated diene block copolymer, and
   (e) adding octadecyl-3-(3,5-di-t-butyl-4-hydroxyphenyl) propionate and trisnonylphenyl phosphite to the vinyl aromatic hydrocarbon-conjugated diene block copolymer after performing the coupling reaction,
   wherein the ion stabilizer is tri-isobutyl aluminum,
   wherein a molar ratio of the ion stabilizer to the organic lithium compound (number of moles of ion stabilizer/number of moles of organic lithium compound) is 0.05 to 0.2, and
   wherein the coupling agent is dichlorodimethylsilane.

2. The method according to claim 1, wherein an amount of the vinyl aromatic hydrocarbon block is 5 to 50% by weight, based on 100% by weight of the vinyl aromatic hydrocarbon-conjugated diene block copolymer.

3. The method according to claim 1, wherein the vinyl aromatic hydrocarbon-conjugated diene block copolymer has a number average molecular weight of 5,000 to 500,000.

4. The method according to claim 1, wherein the vinyl aromatic hydrocarbon monomer is at least one selected from the group consisting of styrene, alpha-methylstyrene, 3-methylstyrene, 4-methylstyrene, 4-propylstyrene, 1-vinylnaphthalene, 4-cyclohexylstyrene, 4-(p-methylphenyl)styrene, and 1-vinyl-5-hexylnaphthalene.

5. The method according to claim 1, wherein the conjugated diene is at least one selected from the group consisting of 1,3-butadiene, 2,3-dimethyl-1,3-butadiene, piperylene, 3-butyl-1,3-octadiene, isoprene, and 2-phenyl-1,3-butadiene.

* * * * *